United States Patent [19]

Conn

[11] Patent Number: 4,750,690
[45] Date of Patent: Jun. 14, 1988

[54] UPWARD VIEWING OBSERVATION WINDOW FOR HOT AIR BALLOON

[76] Inventor: Sidney H. Conn, 139 N. Mulberry St., Statesville, N.C. 28677

[21] Appl. No.: 25,180

[22] Filed: Mar. 12, 1987

[51] Int. Cl.$^4$ ............................................. B64B 1/58
[52] U.S. Cl. .................................... 244/126; 244/31; 244/129.3
[58] Field of Search ................... 244/126, 31, 33, 125, 244/129.3

[56] References Cited

U.S. PATENT DOCUMENTS

| | | | |
|---|---|---|---|
| 3,337,162 | 8/1967 | Bauserman | 244/31 |
| 4,174,082 | 11/1979 | Eshoo | 244/31 |
| 4,390,149 | 6/1983 | Barnes et al. | 244/31 |

Primary Examiner—Galen Barefoot
Attorney, Agent, or Firm—W. Thad Adams, III

[57] ABSTRACT

A hot air balloon envelope (11) of the type having a downwardly-directed bottom opening (12) and characterized by being formed of a multiplicity of elongate gores (26) joined along adjacent sides, each of the gores being formed of a multiplicity of joined-together individual fabric panels (30). The improvement comprises at least one observation window (40) positioned in the upper hemisphere of the envelope in substitution for an envelope panel and having a size and transparency sufficient to permit an occupant of a balloon carriage (20) suspended from the envelope to look upwardly through the bottom opening and the observation window to view large objects, such as other balloons in the vicinity above the balloon envelope and not otherwise visible from the balloon carriage.

24 Claims, 6 Drawing Sheets

UPWARD VIEWING OBSERVATION WINDOW FOR HOT AIR BALLOON

TECHNICAL FIELD AND BACKGROUND OF THE INVENTION

This invention relates to an upward viewing observation window for a hot air balloon. The need for such a window has been demonstrated as the result of accidents which could have been avoided had the pilot of the balloon been able to know that another balloon was descending on top of his balloon. For example, at the 1985 World Ballon Championships, a large number of balloons were launched in poor weather conditions, including winds up to 1000 feet being layered every 150 feet, causing the balloons to fly in many different directions, depending on the particular wind shear in which the balloon was flying.

One particular balloon was in a steep descent. Another balloon directly beneath it was in a steep ascent but could not see because of the very large blind spot caused by the balloon envelope and therefore did not know of the other balloon. The upper balloon hit the lower balloon tearing a hole large enough to allow the entire carriage to enter. The balloons then separated and the lower balloon began a rapid descent from 750 feet altitude. It hit the ground fast enough to cause serious injuries to the pilot.

Accidents like this could be sometimes avoided except for the inability to see above the balloon. Insofar as is known, provision has never before been made for an upward viewing observation window in a balloon.

SUMMARY OF THE INVENTION

Therefore, it is an object of the invention to provide an upward viewing observation window for a hot air balloon.

It is another object of the invention to provide an upward viewing observation window for a hot air balloon which does not impair the structural integrity of the balloon envelope.

It is still another object of the invention to provide various arrangements of observation windows for a hot air balloon suitable for differing situations.

These and other objects of the present invention are achieved in the preferred embodiments disclosed below by providing a hot air balloon envelope of the type having a downwardly-directed bottom opening and characterized by being formed of a multiplicity of elongate gores joined along adjacent sides, each of the gores being formed of a multiplicity of joined-together individual fabric panels. The improvement comprises at least one observation window positioned in the upper hemisphere of the envelope in substitution for an envelope panel. The window has a size and transparency sufficient to permit an occupant of a balloon carriage suspended from the envelope to look upwardly through the bottom opening and the observation window to view large objects, such as other balloons in the vicinity above the balloon envelope and not otherwise visible from the balloon carriage.

One embodiment of the invention comprises a plurality of observation windows spaced randomly apart from each other.

Another embodiment of the invention comprises a plurality of observation windows spaced symmetrically apart from each other.

Still other embodiments of the invention comprise a plurality of observation windows formed by substitution of a pair of adjacent panels, a plurality of observation windows formed by substitution of a plurality of pairs of adjacent panels, a plurality of observation windows formed by substitution of a plurality of pairs of adjacent panels, wherein the panels are symmetrically spaced-apart, a plurality of observation windows formed by substitution of three adjacent panels, a plurality of observation windows formed by substitution of a plurality of groups of three adjacent panels, and a plurality of observation windows formed by substitution of a plurality of groups of three adjacent panels, wherein the panels are symmetrically spaced-apart.

In accordance with one preferred embodiment of the invention, the observation window is formed of Mylar sheet material laminated to a scrim. The scrim may be a suitable polyester material.

According to a preferred embodiment of the invention, the balloon includes an air release valve positioned at the apex of the envelope and also formed of a multiplicity of elongate gores joined along adjacent sides, each of the gores being formed of a multiplicity of joined together, individual fabric panels, and wherein the at least one observation is located on the valve.

In all of the embodiments set forth above, the envelope may be included in combination with a carriage and burner to form a hot air balloon.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
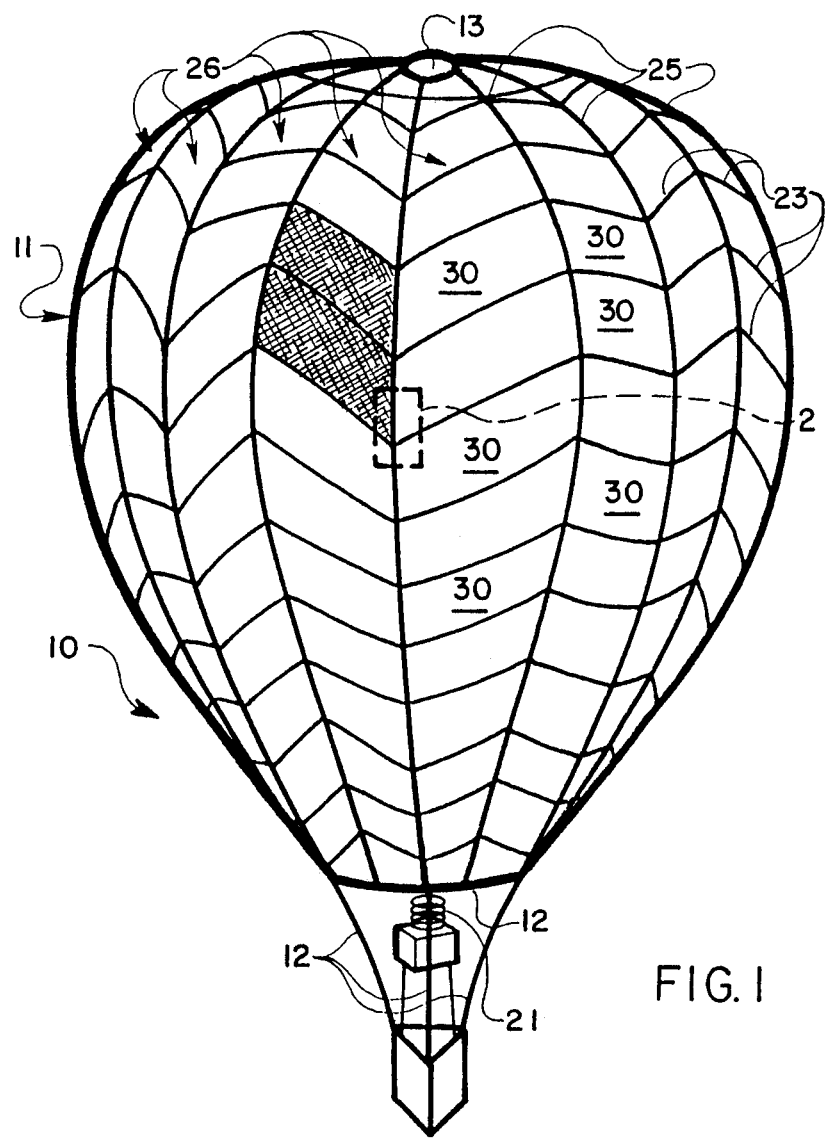
FIG. 1 is a perspective simplified view of a hot air balloon with an observation window according to an embodiment of the present invention.

Referring now specifically to the drawings, a balloon according to the present invention is illustrated in FIG. 1 and shown generally at reference numeral 10. The balloon 10 is shown in simplified form for clarity. The balloon includes an envelope 11 which, when properly inflated, has a generally spherical shape. Envelope 11 defines an open mouth 12 at the lower end and an apex 13 at the upper end. Typically, such envelopes 11 will contain between approximately 900 to 3000 cubic meters of heated air when properly inflated.

Figure 4:
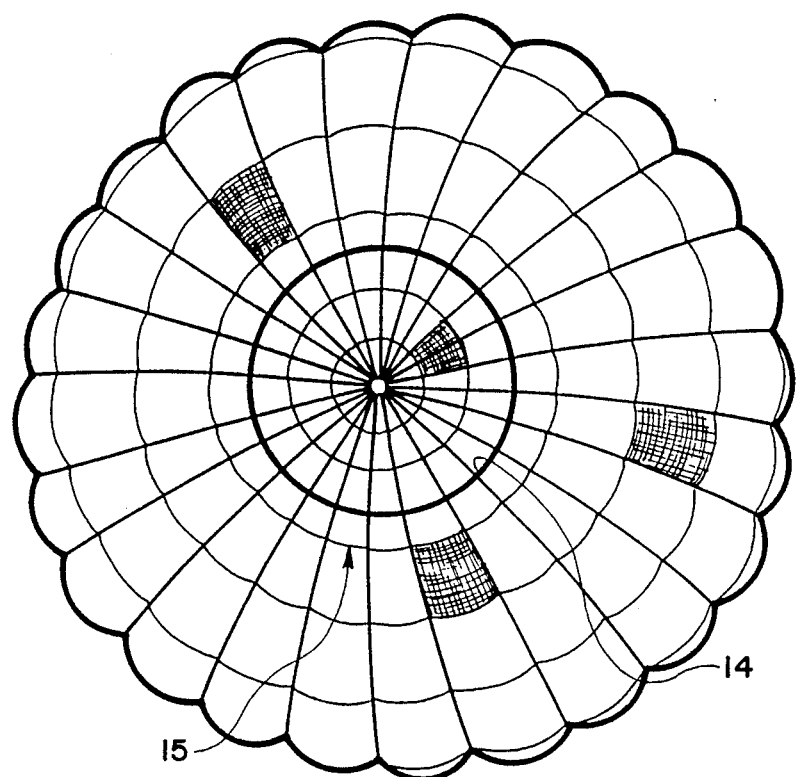
FIG. 4 is a top plan view of an envelope showing randomly-spaced observation windows.

As is best shown in FIG. 4, a relatively large circular opening 14 is formed in the apex 12 of envelope 11 and is normally covered with a valve 15 which can be manipulated by the pilot to uncover a portion of opening 14 to permit controlled venting or deflation of the envelope 11.

Referring again to FIG. 1, balloon 10 also includes a carriage 20 mounted directly below the mouth 12 within which the pilot and any passengers ride. In addition, the carriage 20 also mounts a propane gas burner 21 and one or more fuel tanks (not shown) which supply fuel under pressure to burner 21. Burner 21 heats air within the envelope 11 and thereby creates the lift necessary to cause the balloon 10 to fly.

Envelope 11 is formed of a lattice of interconnected woven fabric tapes to provide a web-like structural frame for the envelope 11. The lattice of tapes includes a number of vertically arranged tapes 25 which collectively divide the envelope 11 into a plurality of vertically disposed, elongate gores 26, each of which extend from apex 13 to mouth 12.

The lattice also includes a number of laterally arranged tapes 28 which extend between the vertical tapes 25. These laterally arranged tapes 25 are substantially parallel to each other in each gore 26 but not perpendicular to the vertical tapes, whereby the open areas between the tapes 25 and 28 define rhomboid-like enclosed quadrilateral open areas. Except for those areas where the observation windows are located, these open areas are covered with panels 30, formed of a very lightweight, air impermeable material such as any one of a variety of woven, continuous filament polymer fabrics. The panels 30 are secured to tapes 25 and 28 by zig-zag lock stitching.

Figure 2:
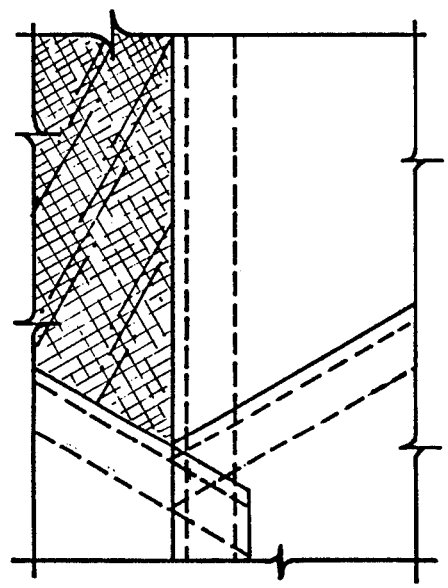
FIG. 2 is an enlarged view of the portion of the balloon envelope indicated at the area 2 in FIG. 1.
Figure 3:
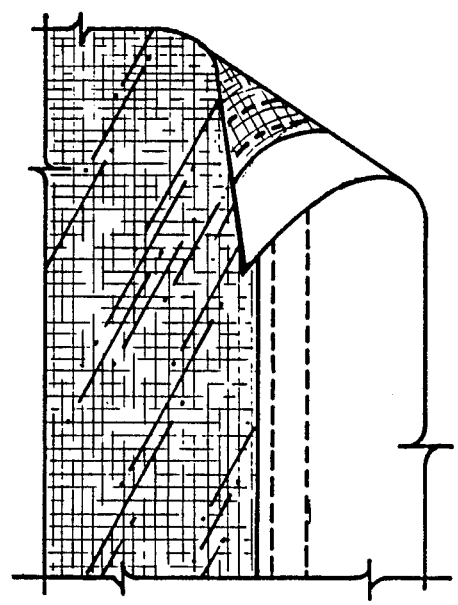
FIG. 3 is a view similar to that in FIG. 2, showing the reverse side of the seam area.

A relatively low number of the open spaces are covered with a semi-transparent sheet material and define observation windows 40. The material used must be in all respects sufficiently strong so that the stuctural integrity of the envelope 11 is not impaired. One such suitable material is a 1.7 oz./sq.yd. Mylar warp oriented three ply film having a thickness of 1.0 mil. This material, as is best shown in FIGS. 2 and 3, has filling and warp strands formed into a scrim laminated to the film for strength and tear resistance. The filling and warp fibers are in the form of flat, untwisted tapes of high-strength polyester or some other suitable fiber with 18 warp strands per inch and 10 filling strands per inch. The windows 40 are secured to tapes 25 and 28 with a CDn or SDn type stitch (Federal Standard 751a). The net effect of the construction described above is a semi-transparent window with good light transmission but with a considerable degree of detail distortion caused by the warp and filling strands. This is not a disadvantage since the only purpose of the windows 40 is to be able to detect the nearby presence of very large objects such as balloon envelopes. Such objects are detected primarily by the blockage of light through the window 40—a function which the material construction of window 40 described above performs quite well.

The windows are positioned in the upper hemisphere only of envelope 11 and are positioned to provide a good field of vision into the area above envelope 11. If another balloon is close enough to cause concern, it will certainly be visible over a large percentage of the upper surface of envelope 11. Therefore, only a few—certainly 16 or less—windows 40 are needed. As is shown in FIG. 1, windows 40 can be placed in the main portion of envelope 11 itself. Viewing through window 40 in FIG. 1 would provide the pilot with a good peripheral view of the area above the envelope 11.

Preferably, windows 40 are placed not only in the main part of the envelope 11, but particularly in valve 15. This permits a view straight up into the area directly above the balloon where other balloons are most likely not to otherwise be seen. Also, the valve does not provide significant strength to envelope 11, so that the windows in valve 15 have no effect at all on the strength of the envelope.

Several possible arrangements of windows 40 are shown in FIGS. 4–7. In FIG. 4 a suitable arrangement for the main part of envelope 11 is shown with three windows 40a, 40b and 40c positioned in three separate gores 26 and panel rows of envelope 11. This arrangement provides a good field of view and isolates the windows in different stress areas of the envelope 11. In addition, a window 40d in valve 15 permits a straight up view.

Figure 5:
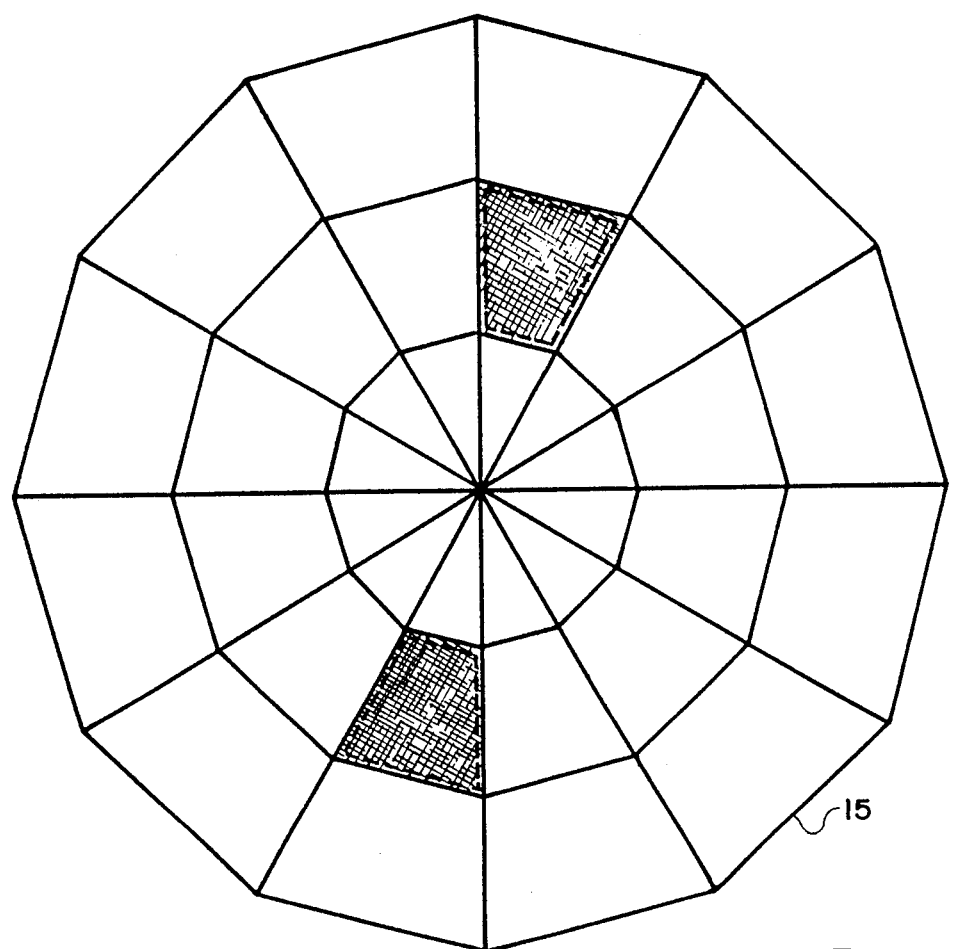
FIGS. 5, 6, and 7 are top plan views of the valve portion of the envelope shown in FIG. 4 according to other embodiments of the invention.
Figure 6:
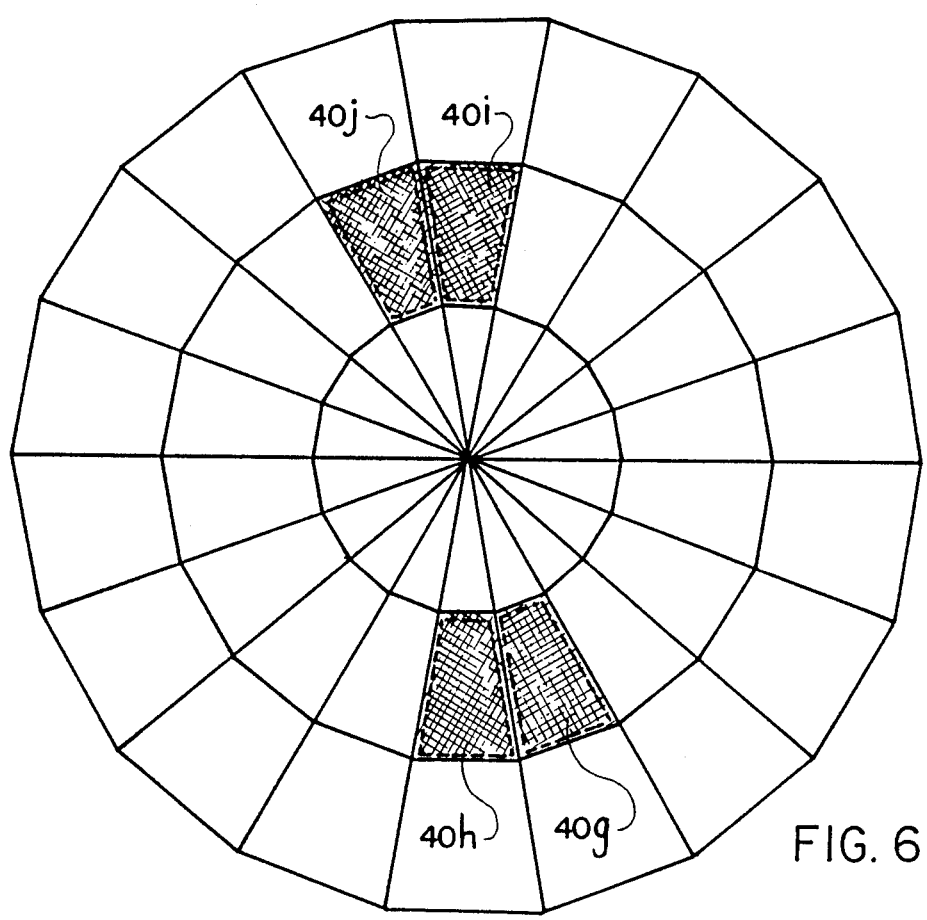
Figure 7:
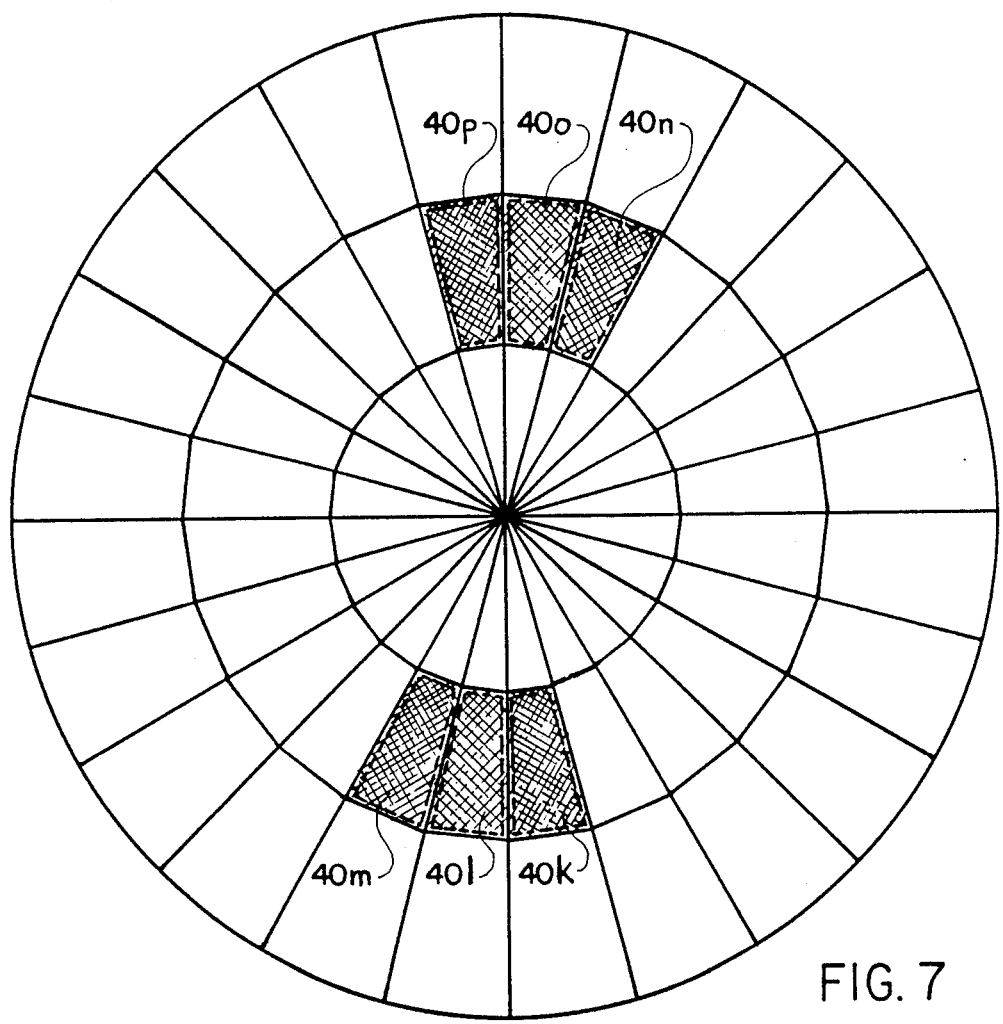

A pair of diametrically spaced-apart windows 40e and 40f are shown in valve 15 in FIG. 5. This is a suitable arrangement for a relatively small envelope 11. In larger envelopes 11, pairs of windows 40g,40h and 40i,40j or triplets of windows 40k,40l,40m and 40n,40o,40p can be used.

A balloon and balloon envelope having upward viewing observation windows is described above. Various details of the invention may be changed without departing from its scope. Furthermore, the foregoing description of the preferred embodiment according to the present invention is provided for the purpose of illustrating only and not for the purpose of limitation—the invention being defined by the claims.

I claim:

1. In a hot air balloon envelope of the type having a downwardly-directed bottom opening and characterized by being formed of a multiplicity of elongate gores joined along adjacent sides, each of said gores being formed of a multiplicity of relatively small, joined-together, individual panels constructed of opaque material, the improvement which comprises at least one but no more than six observation windows positioned in the upper hemisphere of the envelope in substitution for at least one envelope panel and having a transparency sufficient to permit an occupant of a balloon carriage suspended from the envelope to look upwardly through the bottom opening and the observation window to view large objects, such as other balloons in the vicinity above the balloon envelope and not otherwise visible from the balloon carriage.

2. In a hot air balloon envelope according to claim 1, and including a plurality of observation windows spaced randomly apart from each other and separated from each other by opaque panels of the envelope.

3. In a hot air balloon envelope according to claim 1, and including a plurality of observation windows spaced symmetrically apart from each other.

4. In a hot air balloon envelope according to claim 1, and including a pair of observation windows formed by substitutions of a pair of adjacent panels.

5. In a hot air balloon envelope according to claim 1, and including a plurality of observation windows formed by substitution of a plurality of pairs of adjacent panels.

6. In a hot air balloon envelope according to claim 1, and including a plurality of observation windows formed by substitution of a plurality of pairs of adjacent panels, wherein said panels are symmetrically spaced-apart.

7. In a hot air balloon envelope according to claim 1, and including a pair of observation windows, each formed by substitution of three adjacent panels.

8. In a hot air balloon envelope according to claim 1, and including a pair of observation windows formed by substitution of a pair of groups of three adjacent panels.

9. In a hot air balloon envelope according to claim 1, and including a pair of observation windows formed by substitution of a pair of groups of three adjacent panels, wherein said panels are symmetrically spaced-apart.

10. In a hot air balloon envelope according to claim 1, wherein said observation window is formed of Mylar sheet material laminated to a scrim.

11. In a hot air balloon envelope according to claim 10, wherein said scrim comprises polyester.

12. In a hot air balloon envelope according to claim 1, wherein said balloon includes an air release valve positioned at the apex of the envelope and also formed of a multiplicity of elongate gores joined along adjacent sides, each of said gores being formed of a multiplicity of joined together individual fabric panels, and wherein said at least one observation window is located on said valve.

13. In a hot air balloon of the type having a fabric envelope having a downwardly-directed bottom opening and characterized by being formed of a multiplicity of elongate gores joined along adjacent sides, each of said gores being formed of a multiplicity of relatively small, joined-together, individual panels formed of an opaque material; a balloon carriage suspended from the envelope by a plurality of load lines and a burner carried by the carriage and positioned below the bottom opening in the envelope for heating the air within the envelope, the improvement which comprises at least one but no more than six observation windows positioned in the upper hemisphere of the envelope in substitution for at least one envelope panel and having a size and transparency sufficient to permit an occupant of a balloon carriage suspended from the envelope to look upwardly through the bottom opening and the observation window to view large objects, such as other balloons in the vicinity above the balloon envelope and not otherwise visible from the balloom carriage.

14. In a hot air balloon according to claim 1, and including a plurality of observation windows spaced randomly apart from each other and separated from each other by opaque panels of the envelope.

15. In a hot air balloon according to claim 1, and including a plurality of observation windows spaced symmetrically apart from each other.

16. In a hot air balloon according to claim 1, and including a pair of observation windows formed by substitution of a pair of adjacent panels.

17. In a hot air balloon according to claim 1, and including a plurality of observation windows formed by substitution of a plurality of pairs of adjacent panels.

18. In a hot air balloon according to claim 1, and including a plurality of observation windows formed by substitution of a plurality of pairs of adjacent panels, wherein said panels are symmetrically spaced-apart.

19. In a hot air balloon according to claim 1, and including a pair of observation windows, each formed by substitution of three adjacent panels.

20. In a hot air balloon according to claim 1, and including a pair of observation windows formed by substitution of a pair of groups of three adjacent panels.

21. In a hot air balloon according to claim 1, and including a plurality of observation windows formed by substitution of a plurality of groups of three adjacent panels, wherein said panels are symmetrically spaced-apart.

22. In a hot air balloon according to claim 1, wherein said observation window is formed of Mylar sheet material laminated to a scrim.

23. In a hot air balloon according to claim 10, wherein said scrim comprises polyester.

24. In a hot air balloon according to claim 1, wherein said balloon includes an air release valve positioned at the apex of the envelope and also formed of a multiplicity of elongate gores joined along adjacent sides, each of said gores being formed of a multiplicity of joined-together individual fabric panels, and wherein said at least one observation window is located on said valve.

* * * * *

UNITED STATES PATENT AND TRADEMARK OFFICE
CERTIFICATE OF CORRECTION

PATENT NO. : 4,750,690
DATED : June 14, 1988
INVENTOR(S) : Conn, Sidney

It is certified that error appears in the above-identified patent and that said Letters Patent is hereby corrected as shown below:

In Column 5, Line 39, Claim 14, change "1" to --13--.
In Column 6, Line 3, Claim 15, change "1" to --13--.
In Column 6, Line 6, Claim 16, change "1" to --13--.
In Column 6, Line 9, Claim 17, change "1" to --13--.
In Column 6, Line 12, Claim 18, change "1" to --13--.
In Column 6, Line 16, Claim 19, change "1" to --13--.
In Column 6, Line 19, Claim 20, change "1" to --13--.
In Column 6, Line 22, Claim 21, change "1" to --13--.
In Column 6, Line 27, Claim 22, change "1" to --13--.
In Column 6, Line 30, Claim 23, change "10" to --22--.
In Column 6, Line 32, Claim 24, change "1" to --13--.

Signed and Sealed this

Nineteenth Day of October, 1993

Attest:

BRUCE LEHMAN

Attesting Officer

Commissioner of Patents and Trademarks